(12) United States Patent
Humes et al.

(10) Patent No.: US 11,578,654 B2
(45) Date of Patent: Feb. 14, 2023

(54) CENTRIFICAL COMPRESSOR ASSEMBLY FOR A GAS TURBINE ENGINE

(71) Applicant: Rolls-Royce North American Technologies Inc., Indianapolis, IN (US)

(72) Inventors: Ryan C. Humes, Indianapolis, IN (US); Andrew J. Eifert, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 17/360,653

(22) Filed: Jun. 28, 2021

(65) Prior Publication Data

US 2022/0034259 A1 Feb. 3, 2022

Related U.S. Application Data

(60) Provisional application No. 63/058,167, filed on Jul. 29, 2020.

(51) Int. Cl.
*F02C 7/00* (2006.01)
*F02C 3/08* (2006.01)
*F02C 3/14* (2006.01)

(52) U.S. Cl.
CPC .................. *F02C 7/00* (2013.01); *F02C 3/08* (2013.01); *F02C 3/14* (2013.01); *F05D 2220/32* (2013.01)

(58) Field of Classification Search
CPC ...... F02C 7/00; F02C 3/08; F02C 3/14; F05D 2220/32
See application file for complete search history.

(56) References Cited

U.S. PATENT DOCUMENTS

| | | | |
|---|---|---|---|
| 2,419,669 A | 4/1947 | Birmann |
| 2,609,141 A | 9/1952 | Aue |
| 2,662,553 A | 12/1953 | Norman |
| 2,967,013 A | 1/1961 | Dallenbach et al. |
| 3,644,055 A | 2/1972 | Davis |
| 3,719,430 A | 3/1973 | Blair et al. |
| 3,860,360 A | 1/1975 | Yu |
| 3,861,826 A | 1/1975 | Dean, Jr. |
| 3,876,328 A | 4/1975 | Exley |
| 3,905,721 A | 9/1975 | Fitzpatrick |
| 3,936,223 A | 2/1976 | Baghdadi |
| 4,027,997 A | 6/1977 | Bryans |
| 4,100,732 A | 7/1978 | Bryans et al. |
| 4,344,737 A | 8/1982 | Liu |

(Continued)

FOREIGN PATENT DOCUMENTS

| | | |
|---|---|---|
| FR | 2922939 A1 | 5/2009 |
| FR | 3024887 A1 | 2/2016 |

(Continued)

*Primary Examiner* — Steven M Sutherland
(74) *Attorney, Agent, or Firm* — Barnes & Thornburg LLP

(57) ABSTRACT

A compressor adapted for use in a gas turbine engine includes an impeller, a diffuser, and a deswirler. The impeller is arranged circumferentially about an axis and configured to rotate about the axis. The diffuser is arranged circumferentially around the impeller to receive the air from the impeller. The deswirler is configured to receive the air from the diffuser and to conduct the air into a combustion chamber.

17 Claims, 4 Drawing Sheets

(56) References Cited

U.S. PATENT DOCUMENTS

| | | |
|---|---|---|
| 4,349,314 A | 9/1982 | Erwin |
| 4,431,374 A | 2/1984 | Benstein et al. |
| 4,576,550 A | 3/1986 | Bryans |
| 4,824,325 A | 4/1989 | Bandukwalla |
| 4,877,373 A | 10/1989 | Bandukwalla |
| 4,938,661 A | 7/1990 | Kobayashi et al. |
| 5,178,516 A | 1/1993 | Nakagawa et al. |
| 5,316,441 A | 5/1994 | Osborne |
| 5,362,203 A | 11/1994 | Brasz |
| 5,564,898 A | 10/1996 | Richards et al. |
| 5,704,211 A | 1/1998 | Hatfield |
| 6,123,506 A | 9/2000 | Brand et al. |
| 6,155,779 A | 12/2000 | Watanabe et al. |
| 6,279,322 B1 | 8/2001 | Moussa |
| 6,442,940 B1 | 9/2002 | Young et al. |
| 6,471,475 B1 | 10/2002 | Sasu et al. |
| 6,540,481 B2 | 4/2003 | Moussa et al. |
| 6,554,569 B2 | 4/2003 | Decker et al. |
| 6,589,015 B1 | 7/2003 | Roberts et al. |
| 6,695,579 B2 | 2/2004 | Meng |
| 6,834,501 B1 | 12/2004 | Vrbas et al. |
| 7,025,566 B2 | 4/2006 | Sasu et al. |
| 7,032,383 B2 | 4/2006 | Weber |
| 7,094,024 B2 | 8/2006 | Nguyen et al. |
| 7,101,151 B2 | 9/2006 | Loringer et al. |
| 7,407,367 B2 | 8/2008 | Mcauliffe et al. |
| 7,442,006 B2 | 10/2008 | Nguyen et al. |
| 7,448,852 B2 | 11/2008 | Abdelwahab et al. |
| 7,500,364 B2 | 3/2009 | Schumacher et al. |
| 7,717,672 B2 | 5/2010 | Barton et al. |
| 7,798,777 B2 | 9/2010 | Moussa et al. |
| 7,827,798 B2 | 11/2010 | Commaret et al. |
| 7,862,295 B2 | 1/2011 | Daguenet |
| 7,871,243 B2 | 1/2011 | Chen et al. |
| 7,955,051 B2 | 6/2011 | Daguenet et al. |
| 8,006,497 B2 | 8/2011 | Nolcheff et al. |
| 8,016,557 B2 | 9/2011 | Abdelwahab et al. |
| 8,038,392 B2 | 10/2011 | Honda et al. |
| 8,047,777 B2 | 11/2011 | Commaret et al. |
| 8,087,491 B2 | 1/2012 | Merchant et al. |
| 8,127,551 B2 | 3/2012 | Commaret et al. |
| 8,142,148 B2 | 3/2012 | Hernandez et al. |
| 8,147,186 B2 | 4/2012 | Ibaraki et al. |
| 8,162,604 B2 | 4/2012 | Khnel et al. |
| 8,231,341 B2 | 7/2012 | Anderson et al. |
| 8,287,236 B2 | 10/2012 | Nishida et al. |
| 8,425,188 B2 | 4/2013 | Dovbush et al. |
| 8,438,854 B2 | 5/2013 | Nolcheff |
| 8,505,305 B2 | 8/2013 | Ziaei et al. |
| 8,511,981 B2 | 8/2013 | Small et al. |
| 8,540,484 B2 | 9/2013 | Hollman et al. |
| 8,585,348 B2 | 11/2013 | Lin et al. |
| 8,616,841 B2 | 12/2013 | Johnson |
| 8,616,843 B2 | 12/2013 | Shibata et al. |
| 8,839,625 B2 | 9/2014 | Napier et al. |
| 9,228,497 B2 | 1/2016 | Ottow et al. |
| 9,291,171 B2 | 3/2016 | Bunel et al. |
| 9,512,733 B2 | 12/2016 | Lombard et al. |
| 9,581,170 B2 | 2/2017 | Holbrook |
| 9,631,814 B1 | 4/2017 | Barton et al. |
| 9,726,032 B2 | 8/2017 | Ress, Jr. et al. |
| 9,874,220 B2 | 1/2018 | Adams |
| 10,208,628 B2 | 2/2019 | Nasir et al. |
| 10,330,121 B2 | 6/2019 | Reynolds et al. |
| 10,352,237 B2 | 7/2019 | Mazur et al. |
| 2005/0163610 A1 | 7/2005 | Higashimori |
| 2007/0183890 A1 | 8/2007 | Nolcheff et al. |
| 2012/0272663 A1 | 11/2012 | Moussa et al. |
| 2016/0003149 A1 | 1/2016 | Suciu et al. |
| 2016/0061212 A1 | 3/2016 | Mokulys et al. |
| 2016/0061219 A1 | 3/2016 | Mokulys et al. |
| 2016/0115971 A1 | 4/2016 | Duong et al. |
| 2016/0138408 A1* | 5/2016 | Bordne ............... F01D 5/147 416/182 |
| 2017/0102005 A1 | 4/2017 | Schuldt et al. |
| 2017/0248155 A1 | 8/2017 | Parker et al. |
| 2017/0292536 A1 | 10/2017 | Knig |
| 2017/0362947 A1 | 12/2017 | Nasir et al. |
| 2018/0135516 A1 | 5/2018 | Nasir et al. |
| 2018/0216629 A1 | 8/2018 | Benetschik et al. |
| 2018/0258959 A1 | 9/2018 | Honda et al. |
| 2018/0274376 A1 | 9/2018 | King et al. |
| 2019/0162191 A1 | 5/2019 | Lesser et al. |
| 2019/0226493 A1 | 7/2019 | Choi et al. |
| 2019/0264705 A1 | 8/2019 | Higashimori et al. |

FOREIGN PATENT DOCUMENTS

| | | |
|---|---|---|
| GB | 702773 A | 1/1954 |
| WO | 2016001364 A1 | 1/2016 |
| WO | 2017129342 A1 | 8/2017 |
| WO | 2018205631 A1 | 11/2018 |
| WO | 2019063384 A1 | 4/2019 |

* cited by examiner

CENTRIFICAL COMPRESSOR ASSEMBLY FOR A GAS TURBINE ENGINE

CROSS REFERENCE TO RELATED APPLICATIONS

This application claims priority to and the benefit of U.S. Provisional Patent Application No. 63/058,167, filed 29 Jul. 2020, the disclosure of which is now expressly incorporated herein by reference.

FIELD OF THE DISCLOSURE

The present disclosure relates generally to gas turbine engines, and more specifically to centrifugal compressors for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Centrifugal compressors use a rotating impeller device to increase kinetic energy in the flow path air and convert the kinetic energy into potential energy in the form of pressure as the air is forced radially outward by the impeller. Such a compressor usually includes a diffuser and deswirler that delivers air from the compressor to the combustor. The diffuser is located downstream and radially outward of the exit of the impeller to decelerate the air delivered from the impeller smoothly and recover static pressure. The deswirler is located downstream of the diffuser and includes vanes that redirect airflow from a circumferential and radial direction to a generally axial direction to be delivered to the combustor.

SUMMARY

The present disclosure may comprise one or more of the following features and combinations thereof.

According the present disclosure, a compressor may comprise an impeller, a diffuser, a deswirler, and a case assembly. The impeller may be arranged circumferentially about an axis and configured to rotate about the axis to compress air. The diffuser maybe arranged circumferentially around the impeller to receive the compressed air from the impeller. The diffuser may be aligned axially with an outer tip of the impeller. The deswirler may be configured to receive the compressed air from the diffuser and to conduct the compressed air into a combustion chamber. The deswirler may be arranged circumferentially about the diffuser.

The case assembly may include an outer case, an inner combustor case, and a plurality of struts. The outer case may be arranged circumferentially about the diffuser. The inner combustor case may be arranged circumferentially around the axis and located radially inward of the outer case. A combustion chamber may be defined radially between the outer case and the inner combustor case. The plurality of struts may extend radially and axially between and interconnect directly the outer case and the inner combustor case. The plurality of struts may allow force loads applied to the inner combustor case during the use of the compressor to be transmitted to the outer case through the plurality of struts to avoid transmitting the force loads through the diffuser.

In some embodiments, the diffuser may be decoupled from the case assembly and the deswirler such that the diffuser may thermally grow radially and axially relative to the case assembly and the deswirler. In other embodiments, the outer case may be integrally formed with the deswirler. The outer case may define an outer wall of the deswirler that is exposed to the compressed air during use of the compressor.

In some embodiments, the inner combustor case may include an axially extending portion and a radially extending portion. The radially extending portion may extend radially between and interconnect the axially extending portion and the deswirler. In some embodiments, the plurality of struts may extend radially and axially away from the radially extending portion of the inner combustor case.

In some embodiments, the case assembly may further include a diaphragm and a plurality of reinforcement fins. The diaphragm may extend from the radially extending portion of the inner combustor case along an aft side of the diffuser. The diaphragm may be configured to block exposure of the aft side of the diffuser to gases in the combustion chamber. The plurality of reinforcement fins may extend axially aft of the diaphragm and may be bounded radially by the inner combustor case and an inner flow path of the deswirler.

According to another aspect of the present disclosure, a compressor may comprise an impeller, a diffuser, and a deswirler assembly. The impeller may be arranged circumferentially about an axis and configured to rotate about the axis to compress air. The diffuser may be arranged circumferentially around the impeller to receive the compressed air from the impeller. The diffuser may be aligned axially with an outer tip of the impeller. The deswirler assembly may be arranged circumferentially about the diffuser and configured to receive the compressed air from the diffuser. The deswirler assembly may conduct the compressed air into a combustion chamber The deswirler assembly may include an outer case, an inner case, and a plurality of vanes. The outer case may extend radially outward and then turn to extend axially aft. The inner case may have a curved flowpath wall and a support wall that extends radially inward from the curved flowpath wall. The curved flowpath wall of the inner case may be spaced apart radially inward from the outer case to define a flow path. The flow path may be shaped to conduct the compressed air received from the diffuser radially outward and then turns to conduct the compressed air axially aft. The plurality of vanes may extend radially between and interconnect directly the curved flowpath wall of the inner case and the outer case.

In some embodiments, the inner case may further include a plurality of reinforcement fins that extend axially away from the support wall. Each of the plurality of reinforcement fins may be spaced apart circumferentially from a neighboring one of the plurality of reinforcement fins. Each of the plurality of reinforcement fins may be connected to the curved flowpath wall.

In some embodiments, the outer case may include an outer wall and a plurality of ribs. The outer wall may extend circumferentially about the axis and define a portion of the flow path. The plurality of ribs may extend radially outward from the outer wall. In other embodiments, each of plurality of ribs may be aligned circumferentially with a respective one of the plurality of reinforcement fins. In another embodiment, each of the plurality of reinforcement fins may extend axially forward and axially aft from the support wall.

In some embodiments, the curved flowpath wall may terminate at an axially aft end to define an outlet of the flow path. The plurality of vanes may each extend axially aft beyond the axially aft end of the curved flowpath wall.

According to another aspect of the present disclosure, a compressor may comprise an impeller, a diffuser, a deswirler, and a case assembly. The impeller may be arranged circumferentially about an axis and configured to rotate about the axis to compress air. The diffuser may be arranged circumferentially around the impeller to receive the compressed air from the impeller. The diffuser may be aligned axially with an outer tip of the impeller. The deswirler may be configured to receive the compressed air from the diffuser and to conduct the compressed air into a combustion chamber.

The case assembly may include an outer case, an inner combustor case, and a plurality of struts. The outer case may be arranged circumferentially about the axis. The inner combustor case may be arranged circumferentially around the axis and located radially inward of the outer case. A combustion chamber may be defined radially between the outer case and the inner combustor case. The plurality of struts may extend radially and axially between and interconnect directly the outer case and the inner combustor case.

The deswirler may include an annular portion and a plurality of discrete ducts. The annular portion may be configured to receive the compressed air from the diffuser. The plurality of discrete ducts may extend aft from the annular portion and into openings defined by the plurality of struts.

In some embodiments, each of the plurality of discrete ducts may be formed to include at least one radially extending vane. In further embodiments, the diffuser may be coupled to the annular portion of the deswirler so that the diffuser and deswirler may be integrally formed as a single, one-piece component.

In some embodiments, the diffuser may be decoupled from the case assembly such that the diffuser may thermally grow radially and axially relative to the case assembly. In another embodiment, the inner combustor case may include an axially extending portion and a radially extending portion that extends radially away from axially extending portion. The plurality of struts may extend radially and axially away from the radially extending portion of the inner combustor case and connect to the outer case.

These and other features of the present disclosure will become more apparent from the following description of the illustrative embodiments.

DETAILED DESCRIPTION OF THE DRAWINGS

Figure 1:
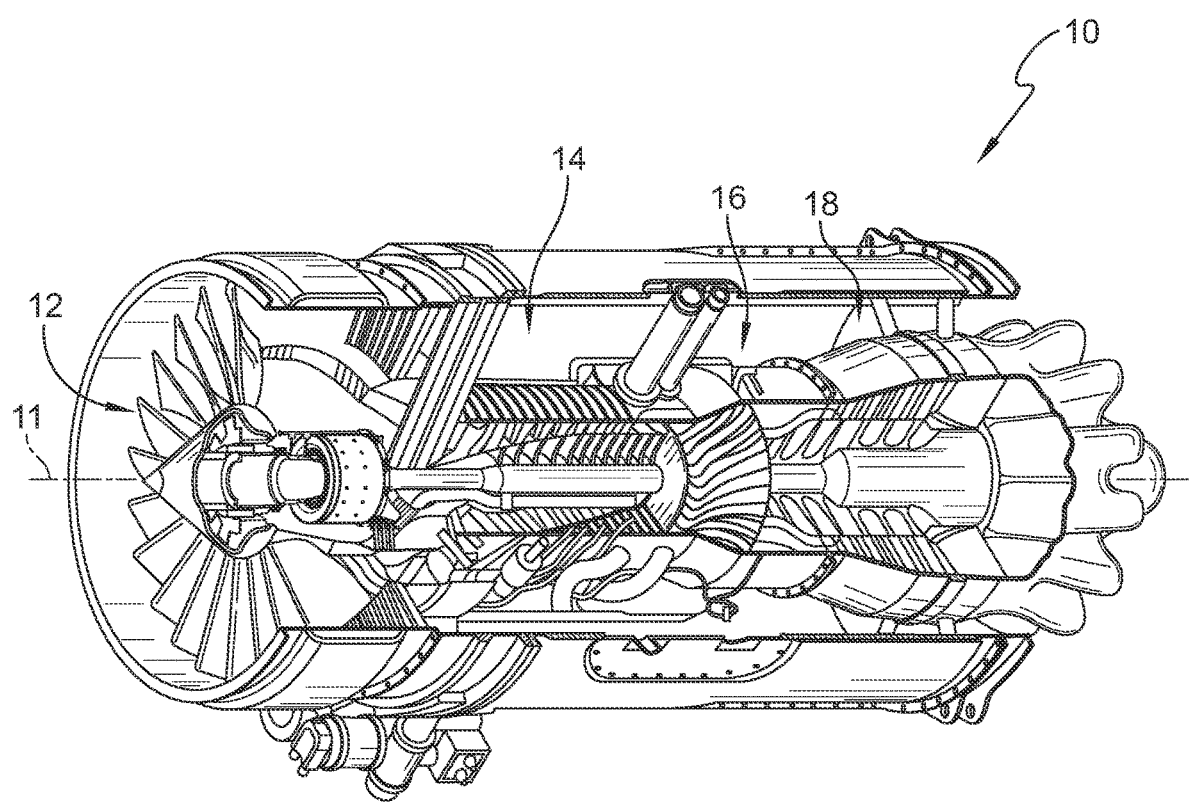
FIG. 1 is a perspective view of a gas turbine engine that includes a fan, a compressor, a combustor, and a turbine, the compressor includes a centrifugal compressor, a diffuser, and deswirler configured to redirect engine loads away from the diffuser device.

For the purposes of promoting an understanding of the principles of the disclosure, reference will now be made to a number of illustrative embodiments illustrated in the drawings and specific language will be used to describe the same.

Figure 2:
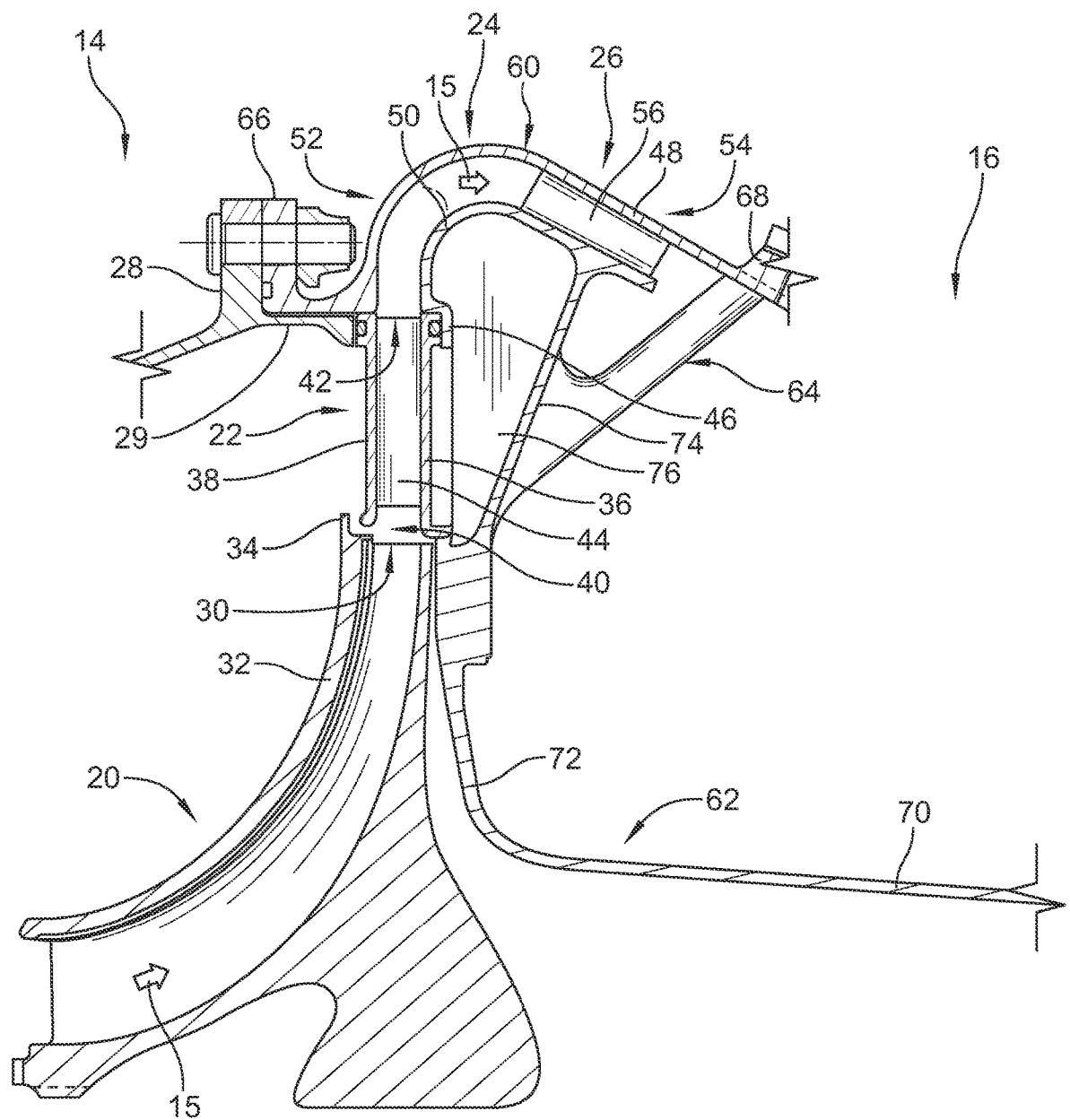
FIG. 2 is a cross-sectional view of a portion of the compressor included in the gas turbine engine of FIG. 1 showing the compressor includes an impeller, the diffuser located radially outward of the impeller and decoupled from the assembly to allow the diffuser to thermally grow, and a deswirler that is integrated with an outer case and an inner combustor casing to provide a case assembly, the inner combustor casing is coupled to the outer casing with a plurality of struts that transfer engine loads from the inner combustor casing to the outer casing without passing through the diffuser.

An illustrative aerospace gas turbine engine 10 includes a fan 12, a compressor 14, a combustor 16, and a turbine 18 as shown in FIG. 1. The compressor 14 includes a diffuser 22, a deswirler 24 and a case assembly 26 as shown in FIG. 2. Illustratively, the deswirler 24 is integrated with the case assembly 26, but, in other embodiments, they are separate components. The case assembly 26 includes an outer case 60, an inner combustor case 62, and a plurality of struts 64 that extends between the inner combustor case 62 and the outer case 60. The plurality of struts 64 and the deswirler 24 transfer engine loads from the inner combustor case 62 to the outer case 60. The deswirler 24 and case assembly 26 arrangement allows for the diffuser 22 to have a floating design so that the diffuser 22 transfers little or no engine loads from the inner combustor case 62 to the outer case 60.

The deswirler 24 includes a plurality of deswirling vanes 56 that extend radially outward from an inner flow path wall 50 that is integrated with the inner combustor case 62 and an outer flow path wall 48 that is integrated with the outer case 60 as shown in FIG. 2. The plurality of struts 64 are circumferentially spaced apart and are located axially aft of the deswirler 24. During engine running, large pressure loads from the combustor 16 are applied to the inner combustor case 62. In the present disclosure, the loads may be transferred from the inner combustor case 62, through the plurality of struts 64 and the deswirler 24, and into the outer case 60 where they can be distributed to adjacent casing structures of the gas turbine engine 10. The loads thereby avoid passing through the diffuser 22.

The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

The compressor 14 includes an impeller 20, a diffuser 22, a deswirler 24, and a case assembly 26. The impeller 20 compresses the air in the gas path 15 and delivers high pressure air to the diffuser 22 that is located radially outward of the impeller 20. The deswirler 24 is located radially outward of the diffuser 22 and extends radially outward and axially aft to deliver the high-pressure air to the combustor 16. The case assembly 26 is located axially aft of the impeller 20 and radially outward of the diffuser 22 and is integrated with the deswirler 24. The case assembly 26 provides structure to the combustor 16 and aft end of the compressor 14 and transfers engine loads generated from radially inward components of the combustor 16 to radially outward components of the gas turbine engine 10.

The impeller 20 includes an outer tip 30 and is surrounded by a shroud 32 and a support wall 34 as shown in FIG. 2. The impeller 20 extends circumferentially around the axis 11 and receives air at an inlet in the axial direction. The impeller 20 rotates about the axis 11 and centrifugal forces from the rotation of the impeller 20 convert kinetic energy in the air into potential energy in the form of pressure as the air is forced radially outward toward the outer tip 30. Compressed air exits the impeller 20 at the outer tip 30 and passes into the diffuser 22. The shroud 32 acts as a seal located radially outward of the impeller 20 to ensure the air remains in the flow path 15 of the impeller 20. The shroud 32 extends axially aft and radially outward along an outer flow path edge of the impeller 20 toward the outer tip 30. The shroud 32 extends a small distance past the outer tip 30 to form a radially extending support wall 34 to block forward axial movement of an inlet 40 of the diffuser 22.

The diffuser 22 includes an aft wall 36, a forward wall 38, an inlet 40, an outlet 42, and a plurality of vanes 44 as shown in FIG. 2. The diffuser 22 is located radially outward of the impeller 20 and extends circumferentially around the axis 11. The aft wall 36 and the forward wall 38 extend radially outward from the inlet 40 and are axially spaced apart. The plurality of vanes 44 are coupled with the forward wall 38 and the aft wall 36 and extend axially therebetween. The plurality of vanes 44 decelerate the air delivered from the impeller 20 to recover static pressure.

The inlet 40 is located at a radially inward terminal end of the diffuser 22 and is adjacent to the outer tip 30 of the impeller 20. The inlet is formed to include shoulders that extend axially forward from the forward wall 38 and axially aft of the aft wall 36. The outlet 42 is located at a radially outer terminal end of the diffuser 22 and is adjacent to an inlet of the deswirler 24. The outlet 42 is formed to include shoulders that extend axially forward from the forward wall 38 and axially aft of the aft wall 36. The shoulders engage with an axially extending support 29 of a forward compressor case 28 and a deswirler inlet support wall 46 of the deswirler 24 to block axial movement of the outlet 42.

In the illustrative embodiment in FIG. 2, the shoulders at the outlet 42 include axially inward seal grooves and rope seals located in the seal grooves to seal against the axially extending support 29 of the forward compressor case 28 and the deswirler inlet support wall 46 of the deswirler 24. The rope seals block gases from exiting the flow path 15 and encourage the compressed air to enter the deswirler 24. The rope seals allow the outlet 42 to slide radially relative to the deswirler 24 and case assembly 26. In some embodiments, metal C-seals may be located in the seal grooves to block gases from exiting the flow path 15 and encourage the compressed air to enter the deswirler 24.

The assembly configuration of the compressor 14 allows the diffuser 22 to be decoupled from the surrounding components so that it can thermally grow axially and radially throughout the engine cycle. As the diffuser 22 thermally grows radially outward, a gap is maintained with the deswirler 24 to prevent the diffuser 22 and the deswirler 24 from binding with each other during the engine cycle. The diffuser 22 may thermally grow inward so that the inlet 40 approaches the outer tip 30 of the impeller 20. The decoupling arrangement of the diffuser 22 avoids engine loads being transferred from the inner combustor case 62 and through the diffuser 22, which lowers the stress in the diffuser 22.

In some embodiments, the diffuser 22 includes an anti-rotation feature to prevent circumferential movement of the diffuser 22 around the axis 11. The anti-rotation feature may include radially extending features in the outlet 42 that engage the deswirler 24, or axially extending features from the aft wall 36 that engage the inner combustor case 62, or radially extending features in the inlet 40 that engage the shroud 32.

The deswirler 24 directs the compressed air from the outlet 42 from the diffuser 22, through the deswirler 24, and delivers the compressed air to the combustor 16 as shown in FIG. 2. The deswirler 24 includes an outer flow path wall 48, an inner flow path wall 50, an arcuate portion 52, and exit portion 54, and a plurality of deswirling vanes 56. The deswirler 24 is located radially outward of the diffuser 22 and extends circumferentially around the axis 11. The arcuate portion 52 extends radially outward from the diffuser 22 and then forms an aft extending smooth radius. The arcuate portion 52 extends through the smooth radius beyond ninety degrees, for example, so that as the arcuate portion 52 transitions into the exit portion 54 with a radially inward and axially aft orientation. The exit portion 54 extends away from the arcuate portion 52 and has an aft terminal end where the compressed air is delivered to the combustor 16.

The outer flow path wall 48 forms the outer boundary of the flow path 15 and is located in the axially forward position of the arcuate portion 52 that becomes the radially outward portion of the arcuate portion 52 and the exit portion 54 as the deswirler 24 extends aft. The inner flow path wall 50 forms the inner boundary of the flow path 15 and is located on the axially aft portion of the arcuate portion 52 that becomes the radially inward portion of the arcuate portion 52 and the exit portion 54 as the deswirler 24 extends aft. The plurality of deswirling vanes 56 are coupled to the outer flow path wall 48 and the inner flow path wall 50 in the exit portion 54 of the deswirler 24 and extend radially outward and axially aft therebetween. The plurality of deswirling vanes 56 redirect airflow from a circumferential direction to a generally axial direction that is delivered to the combustor 16. The deswirler inlet support wall 46 extends axially aft and then radially inward from a forward end of the inner flow path wall 50. The deswirler inlet support wall 46 block axially aft movement of the diffuser 22.

The case assembly 26 is integrated with the deswirler 24 and includes an outer case 60, an inner combustor case 62, and a plurality of struts 64 as shown in FIG. 2. The outer case 60 is located radially outward from the inner combustor case 62 and extends circumferentially around the axis 11. The outer case 60 includes a forward flange 66 and an aft boss 68 that are interconnected with the outer flow path wall 48 of the deswirler 24. The forward flange 66 is located at the forward end of the outer case 60 and is coupled with a forward compressor case structure of the gas turbine engine 10. The forward flange 66 has a radially extending portion and aft axially extending portion that transitions into the outer flow path wall 48. In illustrative embodiment, the transition between the forward flange 66 and the outer flow path wall 48 has a large smooth radius on the outer surface to transfer loads from the case assembly 26 into the forward flange 66 and the forward compressor case 28. The aft boss 68 is located axially aft of the outer flow path wall 48 and extends along the same trajectory as the exit portion 54 of the deswirler 24 and then extends radially outward. The aft boss 68 provides mounting support for a plurality of fuel nozzles that extend through the outer case and provide fuel to the combustor 16.

The inner combustor case 62 is located radially inward of the outer case 60 and extends circumferential around the axis 11 so that the outer case 60 and the inner combustor case 62 define a combustor chamber therebetween. The inner combustor case 62 includes an axially extending portion 70, a radially extending portion 72, a diaphragm 74, and a plurality of reinforcement fins 76 as shown in FIG. 2. The radially extending portion 72 extends radially outward from a forward end of the axially extending portion 70. The axially extending portion 70 extends axially aft and couples with an axially aft component of the combustor 16 or the turbine 18 of the gas turbine engine 10. The radially extending portion 72 extends radially outward and is axially aft and adjacent to the impeller 20. In the illustrative embodiment, the radially extending portion 70 extends to a transition point, with the diaphragm 74 and the plurality of reinforcement fins 76, a small radial distance below and axially aft of the outer tip 30.

The diaphragm 74 extends radially outward and axially aft of the radially extending portion 72 and couples with the inner flow path wall 50 of the deswirler 24 as shown in FIG. 2. In the illustrative embodiment, the diaphragm 74 couples with the inner flow path wall 50 at an axial midway point along the exit portion 54 of the deswirler 24. In some embodiments, the diaphragm may extend radially outward and coupled with a forward end of the inner flow path wall 50. The diaphragm 74 provides a full-hoop wall between the combustion chamber and the diffuser 22 to block combustion gases and pressure fluctuations in the combustor 16 away from the diffuser 22. The diaphragm 74 provides a load path to transfer loads from the axially and radially extending portions 70, 72, and into the deswirler 24 and outer case 60.

The plurality of reinforcement fins 76 are discrete circumferentially spaced plates that extend axially forward of the diaphragm 74 and terminate axially aft of the diffuser 22 as shown in FIG. 2. The plurality of reinforcement fins 76 are bounded by the inner flow path wall 50, the diaphragm 74 and the radially extending portion 72. The plurality of reinforcement fins 76 engage with the shoulders of the inlet 40 of the diffuser 22 to block axially aft movement of the diffuser 22. In some embodiments, the plurality of reinforcement fins 76 may also engage the shoulder of the outlet 42 of the diffuser 22 to block axially aft movement of the diffuser 22. The plurality of reinforcement fins 76 provide a further load path to transfer loads from the axially and radially extending portions 70, 72, into the deswirler 24 and outer case 60. In another embodiment, the plurality of reinforcement fins 76 provide the case assembly 26 with additional structural rigidity to resist distortions in the large structure.

The plurality of struts 64 extend radially outward and axially aft of the diaphragm 74 and interconnect the inner combustor case 62 with the outer case 60 as shown in FIG. 2. The plurality of struts 64 are discrete members that are circumferentially spaced apart around the axis 11. The plurality of struts 64 are located axially aft of the deswirler 24 and extend at a more acute angle relative to the axis 11 than the diaphragm 74. The plurality of struts 64 transition into the diaphragm 74 with large radii to minimize stresses in the case assembly 26. In the illustrative embodiment, the plurality of struts 64 integrate with the outer case 60 forward of the aft boss 68. In some embodiments, the plurality of struts 64 may interconnect with the outer case 60 at a position forward of the aft boss 68 and the engine loads may be transferred to forward and aft portions of the outer case 60.

Figure 3:
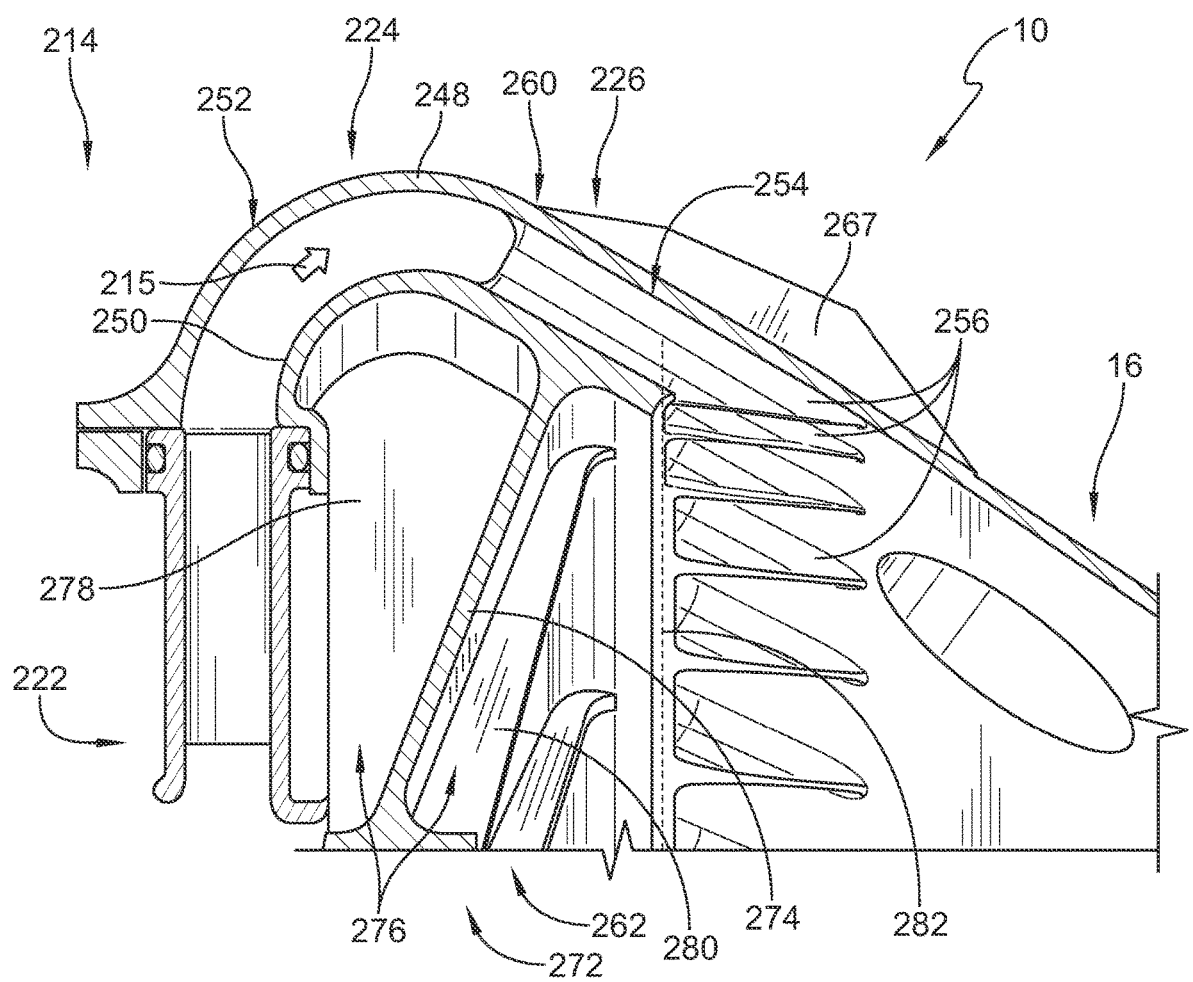
FIG. 3 is a cross-section view of another embodiment of the integrated deswirler and casing assembly of a compressor assembly adapted for use with the engine of FIG. 1 showing the assembly includes an outer case that forms an outer flowpath wall of the deswirler and includes circumferentially spaced fins radially outward of the outer flowpath wall, an inner case that forms an inner flowpath wall of the deswirler and includes a radially inward extending wall and axially extending reinforcement fins that are circumferentially spaced apart, and the deswirler include a plurality of vanes that extend between the inner flowpath wall and the outer flowpath wall.

Another embodiment of a compressor 214 in accordance with the present disclosure is shown in FIG. 3. The compressor 214 is substantially similar to the compressor 14 shown in FIG. 2 and described herein. Accordingly, similar reference numbers in the 200 series indicate features that are common between the compressor 214 and the compressor 14. The description of the compressor 14 is incorporated by reference to apply to the compressor 214, except in instances when it conflicts with the specific description and the drawings of the compressor 214.

The compressor 214 includes an impeller, a diffuser 222, a deswirler 224, and a case assembly 226. The deswirler 224 is located radially outward of the diffuser 222 and extends radially outward and axially aft to deliver the high-pressure air to the combustor 16. The case assembly 226 is located axially aft of the impeller 220 and radially outward of the diffuser 222 and is integrated with the deswirler 224. The deswirler 224 includes an outer flow path wall 248, an inner flow path wall 250, an arcuate portion 252, and exit portion 254, and a plurality of deswirling vanes 256 as shown in FIG. 3. The arcuate portion 252 extends radially outward from the diffuser 222 and then forms an aft extending smooth radius. The arcuate portion 252 extends beyond ninety degrees so that as the arcuate portion 252 transitions into the exit portion 254 with a radially inward and axially aft orientation. The exit portion 254 extends in a straight line away from the arcuate portion 252 and has an aft terminal end where the compressed air is delivered to the combustor 16.

The outer flow path wall 248 forms the outer boundary of the flow path 215 and is located in the axially forward position of the arcuate portion 252 before transitioning to the radially outward portion of the arcuate portion 252 and the exit portion 254 as the deswirler 224 extends aft. The inner flow path wall 250 forms the inner boundary of the flow path 215 and is located on the axially aft portion of the arcuate portion 252 before transitioning to the radially inward portion of the arcuate portion 252 and the exit portion 254 as the deswirler 224 extends aft. The plurality of deswirling vanes 256 are coupled to the outer flow path wall 248 and the inner flow path wall 250 in the exit portion 254 of the deswirler 224 and extend radially outward therebetween.

The case assembly 226 is integrated with the deswirler 224 and includes an outer case 260 and an inner combustor case 262 as shown in FIG. 3. The outer case 260 is located radially outward from the inner combustor case 262 and extends circumferentially around the axis 11. The outer case 260 includes a plurality of ribs 267 and is interconnected with the outer flow path wall 248 of the deswirler 224. The plurality of ribs 267 are discrete fins that are circumferentially spaced apart and extend radially outward from the outer flow path wall 248. The plurality of ribs 267 extend axially along the outer flow path wall 248 radially outward of the plurality of deswirling vanes 256. The plurality of ribs 267 extend axially aft beyond the plurality of deswirling vanes 256 before smoothly transitioning back toward the outer case 260. The plurality of ribs 267 provide additional stiffening capability to the outer case 260 and allow for loads transferred through the case assembly 226 to be spread across the plurality of ribs 267 to reduce stresses in the outer case 260.

The inner combustor case 262 is located radially inward of the outer case 260 and extends circumferential around the axis 11 so that the outer case 260 and the inner combustor case 262 define a combustor chamber therebetween. The inner combustor case 262 includes an axially extending portion 270, a radially extending portion 272, a diaphragm 274, and a plurality of reinforcement fins 276 as shown in FIG. 3. The radially extending portion 272 extends radially outward from a forward end of the axially extending portion 270. The radially extending portion 272 extends radially outward and is axially aft and adjacent to the impeller 220.

The diaphragm 274 extends radially outward and axially aft of the radially extending portion 272 and couples with the inner flow path wall 250 of the deswirler 224 as shown in FIG. 3. In the illustrative embodiment, the diaphragm 274 couples with the inner flow path wall 250 at an axial midway point along the exit portion 254 of the deswirler 224. The diaphragm 274 provides a full-hoop wall between the combustion chamber and the diffuser 222 to block combustion gases and pressure fluctuations in the combustor 16 away from the diffuser 222. The diaphragm 274 provides a load path to transfer loads from the axially and radially extending portions 270, 272, and into the deswirler 224 and outer case 260.

The plurality of reinforcement fins 276 are discrete circumferentially spaced plates that extend axially forward and axially aft of the diaphragm 274 and include a forward portion of reinforcement fins 278 and an aft portion of reinforcement fins 280 as shown in FIG. 3. The forward portion of reinforcement fins 278 terminate axially aft of the diffuser 222. The forward portion of reinforcement fins 278 are bounded by the inner flow path wall 250, the diaphragm 274 and the radially extending portion 272. The forward portion of reinforcement fins 278 engage with the shoulders of the inlet 240 of the diffuser 222 to block axially aft movement of the diffuser 222. In some embodiments, the forward portion of reinforcement fins 278 may also engage the shoulder of the outlet 242 of the diffuser 222 to block axially aft movement of the diffuser 222.

The aft portion of reinforcement fins 280 extend axially aft of the diaphragm 274 by an axial distance determined by the loads expected to be carried by the plurality of reinforcement fins 276. The aft portion of reinforcement fins 280 terminate axially forward of a radially extending boundary line 282 located at the aft terminal end of the inner flow path wall 250. In the illustrative embodiment, the aft portion of reinforcement fins 280 extend approximately midway between the diaphragm 274 and the boundary line 282. The aft portion of reinforcement fins 280 are radially bounded by the inner flow path wall 250 and the radially extending portion 272. The aft portion of reinforcement fins 280 extend in a straight line radially outward and axially aft from the radially extending portion 272 at a more obtuse angle, relative to the axis 11, than the diaphragm 274. In some embodiments the angle through which the aft portion of reinforcement fins 280 extends may be more acute, relative to the axis 11, than the diaphragm 274.

The plurality of reinforcement fins 276 provide a load path to transfer loads from the axially and radially extending portions 270, 272, into the deswirler 224 and outer case 260. In another embodiment, the plurality of reinforcement fins 276 provide the case assembly 226 with additional structural rigidity to resist distortions in the large structure. In some embodiments, the plurality of reinforcement fins 276 are circumferentially aligned with the plurality of ribs 267 in the outer case 260. In another embodiment, the forward portion of reinforcement fins 278, the aft portion of reinforcement fins 280, and the plurality of ribs 267 are all staggered in circumferential alignment. In a further embodiment, the plurality of deswirling vanes 256 are aligned at least one of the forward portion of reinforcement fins 278, the aft portion of reinforcement fins 280, or the plurality of ribs 267.

Figure 4:
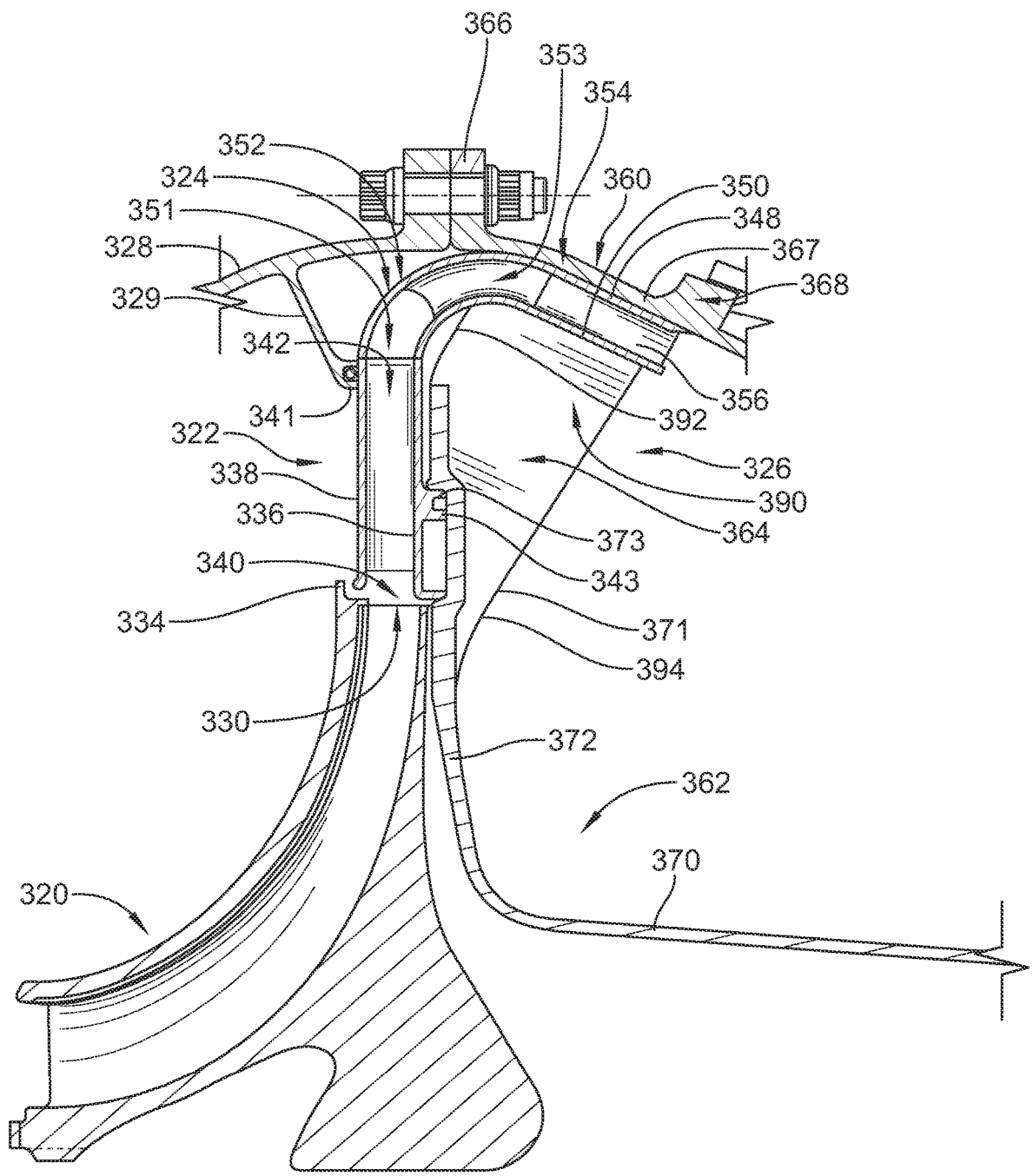
FIG. 4 is a cross-sectional view of a further embodiment of a compressor adapted for use in the engine of FIG. 1 showing the compressor includes an impeller, a diffuser located radially outward of the impeller and decoupled from the assembly to allow the diffuser to thermally grow, a deswirler that forms an annular portion radially outward of the diffuser and a plurality of axially aft extending arc portions that form discrete ducts, and a casing assembly that includes an inner combustor case, an outer case, and a plurality of struts that couple the inner combustor case and the outer case together and are circumferentially spaced apart, and the discrete ducts of the deswirler extend into openings formed between the plurality of struts.

Another embodiment of a compressor 314 in accordance with the present disclosure is shown in FIG. 4. The compressor 314 is substantially similar to the compressor 14 shown in FIG. 4 and described herein. Accordingly, similar reference numbers in the 300 series indicate features that are common between the compressor 314 and the compressor 14. The description of the compressor 14 is incorporated by reference to apply to the compressor 314, except in instances when it conflicts with the specific description and the drawings of the compressor 314.

The compressor 314 includes an impeller 320, a diffuser 322, a deswirler 324, and a case assembly 326 as shown in FIG. 4. The impeller 320 compresses the air in the gas path 15 and delivers high pressure air to the diffuser 322 that is located radially outward of the impeller 320. The deswirler 324 is located radially outward of the diffuser 322 and extends radially outward and axially aft to deliver the high-pressure air to the combustor 16. The case assembly 326 is located axially aft of the impeller 320 and radially outward of the diffuser 322.

The diffuser 322 includes an aft wall 336, an inlet 340, an outlet 342, a forward shoulder 341, and an aft shoulder 343 as shown in FIG. 4. The inlet 340 is formed to include shoulders that engage with the support wall 334 of the impeller 320 and the radially extending portion 372 of the inner combustor case 362 to block axial movement of the inlet 340. The outlet 342 is located at a radially outer terminal end of the diffuser 322 and is adjacent to an inlet of the deswirler 324. The outlet 342 is formed to include a forward shoulder 341 that extends axially forward from the forward wall 338. The forward shoulder 341 engages with an extending support 329 of a forward compressor case 328. The aft shoulder 343 extends axially aft from the aft wall 336 at approximately the mid-point along a radial height of the aft wall 336. The aft shoulder 343 engages the radially extending portion 372 of the inner combustor case 362 to block aft axial movement of the diffuser 322. The aft shoulder 343 further engages a radially inward facing step 373 of the radially extending portion 372 of the inner combustor case 362 to block radially outward movement of the diffuser 322.

In the illustrative embodiment in FIG. 4, the forward and aft shoulders 341, 343 include axially inward seal grooves and rope seals located in the seal grooves to seal against the axially extending support 329 of the forward compressor case 328 and the radially extending portion 372 of the inner combustor case 362. The rope seals block gases from exiting the flow path 15 and encourage the compressed air to enter the deswirler 324. The rope seals allow the diffuser 322 to slide radially inward relative to the deswirler 324 and case assembly 326. In some embodiments, metal C-seals may be located in the seal grooves to block gases from exiting the flow path 15 and encourage the compressed air to enter the deswirler 324.

The deswirler 324 includes an outer flow path wall 348, an inner flow path wall 350, an arcuate portion 352, an exit portion 354, and a plurality of deswirling vanes 356 as shown in FIG. 4. The deswirler 324 is located radially outward of the diffuser 322 and extends circumferentially around the axis 11. The arcuate portion 352 extends radially outward from the diffuser 322 and then forms an aft extending smooth radius. The arcuate portion 352 extends through the smooth radius beyond ninety degrees so that as the arcuate portion 352 transitions into the exit portion 354 with a radially inward and axially aft orientation. The exit portion 354 extends in a straight line away from the arcuate portion 352 and has an aft terminal end where the compressed air is delivered to the combustor 16.

The arcuate portion 352 has an annular section 351 adjacent to the diffuser 322 and extends circumferential around the axis 11. As the arcuate portion 352 translates through the smooth radius the deswirler 324 splits into a plurality of discrete ducts 353. The plurality of discrete ducts 353 extends through the aft section of the arcuate portion 352 and the exit portion 354. The plurality of discrete ducts 353 are spaced apart circumferentially and each discrete duct 353 extends circumferentially around a portion of the axis 11. Each discrete duct 353 is located in a circumferential opening 390 formed between a plurality of struts 364 in the case assembly 326. Each of the plurality of discrete ducts includes at least one deswirling vane 356 in the exit portion 354 of the deswirler 324.

The outer flow path wall 348 forms the outer boundary of the flow path 15 in the arcuate portion 352 and the exit portion 354 of the deswirler 324. The inner flow path wall 350 forms the inner boundary of the flow path 15 of the arcuate portion 352 and the exit portion 354 of the deswirler 324. The plurality of deswirling vanes 356 are coupled to the outer flow path wall 348 and the inner flow path wall 350 in the exit portion 354 of the deswirler 324 and extend radially outward therebetween.

The case assembly 326 includes an outer case 360, an inner combustor case 362, and a plurality of struts 364 as shown in FIG. 4. The outer case 360 is located radially outward from the inner combustor case 362 and extends circumferentially around the axis 11. The outer case 360 includes a forward flange 366, an aft boss 368, and an outer wall 367 that connects the forward flange 366 and the aft boss 368. The outer wall 367 is adjacent to the outer flow path wall 348 of the deswirler 324 and engages with a portion of the outer flow path wall 348 to block radial outward movement of the deswirler 324. In the illustrative embodiment, the deswirler 324 is decoupled from the case assembly 326 and is a separate component. In some embodiments, the outer wall 367 and the outer flow path wall 348 are integrated as a single component. In other embodiments, the outer flow path wall 348 may be mechanically fastened, bonded, brazed, or welded to the outer wall 367.

The forward flange 366 is located at the forward end of the outer case 360 and is coupled with a forward compressor case 328 of the gas turbine engine 10. The forward flange 366 extends radially outward from a forward terminal end of the outer wall 367. The aft boss 368 extends radially outward from an aft end of the outer wall 367. The forward flange 366 transfer loads from the case assembly 326 into forward adjacent structural components of the gas turbine engine 10.

The inner combustor case 362 is located radially inward of the outer case 360 and extends circumferential around the axis 11 so that the outer case 360 and the inner combustor case 362 define a combustor chamber therebetween. The inner combustor case 362 includes an axially extending portion 370, and a radially extending portion 372 as shown in FIG. 4. The radially extending portion 372 extends radially outward from a forward end of the axially extending portion 370. The axially extending portion 370 extends axially aft and couples with an axially aft component of the combustor 16 or the turbine 18 of the gas turbine engine 10.

The radially extending portion 372 extends radially outward along an aft side of the impeller 320 and along the aft wall 336 of the diffuser 322. The radially extending portion 372 includes an axial shelf 371 that extends aft adjacent to the inlet 340 of the diffuser 322, and then continues radially outward towards the aft shoulder 343. At the aft shoulder 343 the axial shelf 371 extends axially forward to its original axial extension plane and forms the radially inward facing step 373 that engages the aft shoulder 343 and blocks radially outward movement of the diffuser 322. The radially extending portion 372 continues to extend radially outward to a point axially aft and radially below the outlet 342 of the diffuser 322.

The plurality of struts 364 extend radially outward and axially aft of the radially extending portion 372 and interconnects the inner combustor case 362 with the outer case 360 as shown in FIG. 4. The plurality of struts 364 are discrete members that are circumferentially spaced apart around the axis 11 to form circumferential openings 390 that the plurality of discrete ducts 353 locate between. In the illustrative embodiment, the plurality of struts 364 have an axial dimension that spans the width between forward flange 366 and the aft boss 368. The plurality of struts 364 includes a forward edge 392 and an aft edge 394. The forward edge 392 extends from a radially outward terminal end of the radially extending portion 372 of the inner combustor case 362 toward the forward flange 366 of the outer case 360. The aft edge 394 extends from an inward radial positon of the radially extending portion 372, approximately adjacent to the outer tip 330 of the impeller 320, and extends radially outward toward the aft boss 368 of the outer case 360. In some embodiments, the axial dimension of the plurality of struts 364 may extend a smaller distance than the illustrative embodiment of FIG. 4 depending on the loads the struts are expected to transfer from the inner combustor case 362 to the outer case 360.

Some gas turbine engines have an inner combustor case which is supported on the forward end of the cavity at the compressor exit. This inner case may extend aft to the combustor exit and support the first turbine vane. In some engines the inner case may be supported either directly on the diffuser or by bolts passing through the vanes of the diffuser. The present disclosure removes the diffuser from the load path and maintains aerodynamic efficiency of the diffuser and deswirler.

According to an aspect of the present disclosure, the inner combustor case 62 may be supported by either the deswirler 24 or the outer case 60 axially after of the deswirler 24. In the illustrative embodiment shown in FIG. 2, a plurality of struts 64 extend from the inner combustor case 62 toward the outer case 60 axially aft of the deswirler 24 portion of the flowpath. A diaphragm 74 may exist between the inner combustor case 62 and deswirler 24 to separate different cavities within the gas turbine engine 10. A purpose of the plurality of struts 64 may be to minimize load transfer from the outer case 60 through the deswirler vanes 56 to the diaphragm 74. Minimizing load in the deswirler vanes 56 may allow the deswirler vanes 56 to match the aero intent of the vanes. The position of the plurality of struts 64 aft of the deswirler 24 and flow path 15 may be optimized to best carry the load while minimizing impact on the air entering the combustor cavity.

In the illustrative embodiment shown in FIG. 3, the case assembly 226 does not utilize separate struts to carry the load. In this embodiment, the deswirler vanes 256 maintain optimized aerodynamic shapes, but the deswirler vanes 256 may be extended past the inner flow path wall 250 and blend with the outer flow path wall 248. The extension and blending of the deswirling vanes 256 into the outer flow path wall 248 may reduce the stress in the deswirling vanes 256 and allow them to transfer load without making all the vanes thicker or including larger, intermittent struts into the deswirler flow path.

In the illustrative embodiment shown in FIG. 4, the case assembly 326 includes a plurality of struts 364 to structurally connect the inner combustor case 362 to the outer case 360. The diffuser 322 and deswirler 324 may be positioned between the aft compressor case and the case assembly 326. In the illustrative embodiment, the diffuser 322 and the deswirler 324 are a single part. In some embodiments, the diffuser 322 and the deswirler 324 may be separate parts. The flow path 15 may split aft of the diffuser 322 into separate deswirler sections 353 between each of the plurality of struts 364.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A compressor adapted for use in for a gas turbine engine, the compressor comprising
    an impeller arranged circumferentially about an axis and configured to rotate about the axis to compress air,
    a diffuser arranged circumferentially around the impeller to receive compressed air from the impeller, the diffuser aligned axially with an outer tip of the impeller,
    a deswirler configured to receive the compressed air from the diffuser and to conduct the compressed air into a combustion chamber, the deswirler arranged circumferentially about the diffuser, and
    a case assembly that includes an outer case arranged circumferentially about the diffuser, an inner combustor case arranged circumferentially around the axis and located radially inward of the outer case to define the combustion chamber radially between the outer case and the inner combustor case, and a plurality of struts that extend radially and axially between and interconnect directly the outer case and the inner combustor case so that force loads applied to the inner combustor case during the use of the compressor are transmitted to the outer case through the plurality of struts to avoid transmitting the force loads through the diffuser.

2. The compressor of claim 1, wherein the diffuser is decoupled from the case assembly and the deswirler such that the diffuser may thermally grow radially and axially relative to the case assembly and the deswirler.

3. The compressor of claim 1, wherein the outer case is integrally formed with the deswirler and defines an outer wall of the deswirler that is exposed to the compressed air during use of the compressor.

4. The compressor of claim 3, wherein the inner combustor case includes an axially extending portion and a radially extending portion that extends radially between and interconnects the axially extending portion and the deswirler.

5. The compressor of claim 1, wherein the inner combustor case includes an axially extending portion and a radially extending portion that extends radially away from axially extending portion and the plurality of struts extend radially and axially away from the radially extending portion of the inner combustor case.

6. The compressor of claim 5, wherein the case assembly further includes a diaphragm and a plurality of reinforcement fins, the diaphragm extends from the radially extending portion of the inner combustor case along an aft side of the diffuser to block exposure of the aft side of the diffuser to gases in the combustion chamber, and the plurality of reinforcement fins extend axially aft of the diaphragm and are bounded radially by the inner combustor case and an inner flow path of the deswirler.

7. A compressor adapted for use in for a gas turbine engine, the compressor comprising
    an impeller arranged circumferentially about an axis and configured to rotate about the axis to compress air,
    a diffuser arranged circumferentially around the impeller to receive compressed air from the impeller, the diffuser aligned axially with an outer tip of the impeller,
    a deswirler assembly arranged circumferentially about the diffuser and configured to receive the compressed air from the diffuser and to conduct the compressed air into a combustion chamber, the deswirler assembly including
    an outer case that extends radially outward and then turns to extend axially aft,
    an inner case having a curved flowpath wall and a support wall that extends radially inward from the curved flowpath wall, the curved flowpath wall of the inner case spaced apart radially inward from the outer case to define a flow path shaped to conduct the compressed air received from the diffuser radially outward and then turns to conduct the compressed air axially aft, and
    a plurality of vanes that extend radially between and interconnect directly the curved flowpath wall of the inner case and the outer case,
    wherein the curved flowpath wall terminates at an axially aft end thereof to define an outlet of the flow path and the plurality of vanes each extend axially aft beyond the axially aft end of the curved flowpath wall.

8. The compressor of claim 7, wherein the inner case further includes a plurality of reinforcement fins that extend axially away from the support wall, each of the plurality of reinforcement fins is spaced apart circumferentially from a neighboring one of the plurality of reinforcement fins, and each of the plurality of reinforcement fins connected to the curved flowpath wall.

9. The compressor of claim 8, wherein the outer case includes an outer wall that extends circumferentially about the axis and defines a portion of the flow path and a plurality of ribs that extend radially outward from the outer wall.

10. The compressor of claim 9, wherein each of plurality of ribs is aligned circumferentially with a respective one of the plurality of reinforcement fins.

11. The compressor of claim 8, wherein each of the plurality of reinforcement fins extend axially forward and axially aft from the support wall.

12. A compressor adapted for use in a gas turbine engine, the compressor comprising an impeller arranged circumferentially about an axis and configured to rotate about the axis to compress air, a diffuser arranged circumferentially around the impeller to receive compressed air from the impeller, the diffuser aligned axially with an outer tip of the impeller, a deswirler configured to receive the compressed air from the diffuser and to conduct the compressed air into a combustion chamber, a case assembly that includes an outer case arranged circumferentially about the axis, an inner combustor case arranged circumferentially around the axis and located radially inward of the outer case to define the combustion chamber radially between the outer case and the inner combustor case, and a plurality of struts that extend radially and axially between and interconnect directly the outer case and the inner combustor case, wherein the deswirler includes an annular portion configured to receive the compressed air from the diffuser and a plurality of discrete ducts that extend aft from the annular portion and into openings defined by the plurality of struts.

13. The compressor of claim 12, wherein each of the plurality of discrete ducts is formed to include at least one radially extending vane.

14. The compressor of claim 12, wherein the diffuser is coupled to the annular portion of the deswirler and the diffuser and deswirler are integrally formed as a single, one-piece component.

15. The compressor of claim 12, wherein the diffuser is decoupled from the case assembly such that the diffuser may thermally grow radially and axially relative to the case assembly.

16. The compressor of claim 12, wherein the deswirler is decoupled from the case assembly such that the deswirler may thermally grow radially and axially relative to the case assembly.

17. The compressor of claim 12, wherein the inner combustor case includes an axially extending portion and a radially extending portion that extends radially away from axially extending portion and the plurality of struts extend radially and axially away from the radially extending portion of the inner combustor case and connect to the outer case.

* * * * *